US 11,481,416 B2

(12) United States Patent
Dua et al.

(10) Patent No.: US 11,481,416 B2
(45) Date of Patent: *Oct. 25, 2022

(54) QUESTION ANSWERING USING TRAINED GENERATIVE ADVERSARIAL NETWORK BASED MODELING OF TEXT

(71) Applicant: International Business Machines Corporation, Armonk, NY (US)

(72) Inventors: Dheeru Dua, Irvine, CA (US); Cicero Nogueira Dos Santos, White Plains, NY (US); Bowen Zhou, Beijing (CN)

(73) Assignee: International Business Machines Corporation, Armonk, NY (US)

(*) Notice: Subject to any disclaimer, the term of this patent is extended or adjusted under 35 U.S.C. 154(b) by 1140 days.

This patent is subject to a terminal disclaimer.

(21) Appl. No.: 16/033,313

(22) Filed: Jul. 12, 2018

(65) Prior Publication Data
US 2020/0019642 A1 Jan. 16, 2020

(51) Int. Cl.
G10L 15/22 (2006.01)
G06F 16/332 (2019.01)
(Continued)

(52) U.S. Cl.
CPC ...... G06F 16/3329 (2019.01); G06F 16/3347 (2019.01); G06F 40/216 (2020.01);
(Continued)

(58) Field of Classification Search
CPC ......... G06N 3/08; G10L 15/16; G10L 15/197; G10L 15/22; G10L 2015/225
(Continued)

(56) References Cited

U.S. PATENT DOCUMENTS 8,098,939 B2  1/2012  Oliver
8,984,297 B2* 3/2015  Amir ............... H04L 63/12
                                                    713/188
(Continued)

OTHER PUBLICATIONS

S. Shim, G. Chodwadia, K. Jain, C. Patel, E. Sorathia and C. Choo, "Supervised question answering system for technical support," 2018 IEEE 8th Annual Computing and Communication Workshop and Conference (CCWC), 2018, pp. 216-220, doi: 10.1109/CCWC.2018.8301764. (Year: 2018).*

(Continued)

Primary Examiner — Bharatkumar S Shah
(74) Attorney, Agent, or Firm — Stephen J. Walder, Jr.; David Mattheis

(57) ABSTRACT

Mechanisms are provided for implementing a Question Answering (QA) system utilizing a trained generator of a generative adversarial network (GAN) that generates a bag-of-ngrams (BoN) output representing unlabeled data for performing a natural language processing operation. The QA system obtains a plurality of candidate answers to a natural language question, where each candidate answer comprises one or more ngrams. For each candidate answer, a confidence score is generated based on a comparison of the one or more ngrams in the candidate answer to ngrams in the BoN output of the generator neural network of the GAN. A final answer to the input natural language question is selected from the plurality of candidate answers based on the confidence scores associated with the candidate answers, and is output.

20 Claims, 7 Drawing Sheets

(51) Int. Cl.
　　*G10L 15/197*　　(2013.01)
　　*G06N 3/08*　　(2006.01)
　　*G10L 15/16*　　(2006.01)
　　*G06F 16/33*　　(2019.01)
　　*G06F 40/216*　　(2020.01)

(52) U.S. Cl.
　　CPC .............. *G06N 3/08* (2013.01); *G10L 15/16* (2013.01); *G10L 15/197* (2013.01); *G10L 15/22* (2013.01); *G10L 2015/225* (2013.01)

(58) Field of Classification Search
　　USPC .......................................................... 704/15
　　See application file for complete search history.

(56) References Cited

U.S. PATENT DOCUMENTS

| | | | |
|---|---|---|---|
| 8,989,297 B1* | 3/2015 | Lou | H04L 27/2637 |
| | | | 375/267 |
| 9,659,248 B1 | 5/2017 | Barbosa et al. | |
| 9,659,560 B2 | 5/2017 | Cao et al. | |
| 9,672,814 B2 | 6/2017 | Cao et al. | |
| 9,947,314 B2 | 4/2018 | Cao et al. | |
| 10,152,970 B1 | 12/2018 | Olabiyi et al. | |
| 10,403,284 B2 | 9/2019 | Olabiyi et al. | |
| 10,776,664 B2 | 9/2020 | Tsishkou et al. | |
| 11,049,500 B2 | 6/2021 | Olabiyi et al. | |
| 2012/0310627 A1 | 12/2012 | Qi et al. | |
| 2019/0122077 A1 | 4/2019 | Tsishkou et al. | |
| 2019/0244609 A1 | 8/2019 | Olabiyi et al. | |
| 2019/0251169 A1* | 8/2019 | Loghmani | G06F 40/295 |
| 2019/0258939 A1* | 8/2019 | Min | G06F 40/30 |
| 2019/0385609 A1 | 12/2019 | Olabiyi et al. | |
| 2020/0019863 A1 | 1/2020 | Dua et al. | |
| 2021/0248376 A1* | 8/2021 | Zhao | G06V 10/82 |
| 2021/0327428 A1 | 10/2021 | Olabiyi et al. | |

OTHER PUBLICATIONS

Q. Liu and W. Shen, "Modeling and Analysis in Technology Problem Answering System," 2018 International Conference on Intelligent Transportation, Big Data & Smart City (ICITBS), 2018, pp. 756-759, doi: 10.1109/ICITBS.2018.00195. (Year: 2018) (Year: 2018).*

S. Shim, G. Chodwadia, K. Jain, C. Patel, E. Sorathia and C. Choo, "Supervised question answering system for technical support," 2018 IEEE 8th Annual Computing and Communication Workshop and Conference (CCWC), 2018, pp. 216-220, doi: 10.1109/CCWC.2018.8301764. (Year: 2018) (Year: 2018).*

Q. Liu and W. Shen, "Modeling and Analysis in Technology Problem Answering System," 2018 International Conference on Intelligent Transportation, Big Data & Smart City (ICITBS), 2018, pp. 756-759, doi: 10.1109/ICITBS.2018.00195. (Year: 2018).*

Glover, John, "Modeling Documents with Generative Adversarial Networks", NIPS Workshop on Adversarial Training, arXiv preprint arXiv:1612.09122, Dec. 2016, 6 pages.

Wang, Baiyang et al., "Generative Adversarial Nets for Multiple Text Corpora", arXiv preprint arXiv:1712.09127, Dec. 2017, 16 pages.

Zhang, Yizhe et al., "Generating Text via Adversarial Training", NIPS workshop on Adversarial Training, vol. 21, pp. 21-32, academia.edu, Dec. 2016, 7 pages.

Zhang, Kai et al., "Loop Closure Detection Based on Generative Adversarial Networks for Simultaneous Localization and Mapping Systems", 2017 Chinese Automation Congress (CAC) doi:10.1109/CAC.2017.8244215, Jul. 2017, 4 pages.

List of IBM Patents or Patent Applications Treated as Related, Feb. 11, 2020, 2 pages.

Denton, Emily et al., "Deep Generative Image Models using a Laplacian Pyramid of Adversarial Networks", Advances in Neural Information Processing Systems (NIPS 2015), Dec. 7-12, 2015, 9 pages.

Goodfellow, Ian J. et al., "Generative Adversarial Nets", Advances in Neural Information Processing Systems (NIPS 2014), Dec. 8-13, 2014, 9 pages.

High, Rob, "The Era of Cognitive Systems: An Inside Look at IBM Watson and How it Works", IBM Corporation, Redbooks, Dec. 12, 2012, 16 pages.

Radford, Alec et al., "Unsupervised Representation Learning with Deep Convolutional Generative Adversarial Networks", Cornell University, arXiv: 1511.06434v1, Nov. 19, 2015, 15 pages.

Reed, Scott, "Generative Adversarial Text to Image Synthesis", Cornell University, arXiv: 1605.05396v1, May 17, 2016, 9 pages.

Yang, Zhen et al., "Improving Neural Machine Translation with Conditional Sequence Generative Adversarial Nets", Institute of Automation, Chinese Academy of Sciences, arXiv: 1703.04887v2, Apr. 17, 2017, 10 pages.

Yuan, Michael J., "Watson and healthcare, How natural language processing and semantic search could revolutionize clinical decision support", IBM Corporation, IBM developerWorks, http://www.ibm.com/developerworks/industry/library/ind-watson/, Apr. 12, 2011, 14 pages.

Zhang, Yizhe et al., "Adversarial Feature Matching for Text Generation", 34th International Conference on Machine Learning, Sydney, Australia, PMLR 70, Aug. 6-11, 2017, 10 pages.

\* cited by examiner

QUESTION ANSWERING USING TRAINED GENERATIVE ADVERSARIAL NETWORK BASED MODELING OF TEXT

BACKGROUND

The present application relates generally to an improved data processing apparatus and method and more specifically to mechanisms for providing question answering capabilities using a trained generative adversarial network based model of text.

Natural language processing is a field of computer science, artificial intelligence, and computational linguistics concerned with the interactions between computers and human (natural) languages, and, in particular, concerned with programming computers to fruitfully process large natural language corpora. Challenges in natural language processing frequently involve natural language understanding, natural language generation (frequently from formal, machine-readable logical forms), connecting language and machine perception, dialog systems, or some combination thereof.

One model often used with natural language processing is the bag-of-words (BOW) model, or continuous bag-of-words (CBOW) model. The bag-of-words model is a simplifying representation used in natural language processing and information retrieval (IR) in which a text, such as a sentence or a document, is represented as the bag (multiset) of its words, disregarding grammar, and even word order, but keeping multiplicity. The bag-of-words model is commonly used in methods of document classification where the frequency of occurrence of each word is used as a feature for training a classifier. The CBOW model works by predicting the probability of a word given a context, e.g., where the context may be a single word or group of words, e.g., given a single context word, CBOW predicts a single target word.

Generative models learn a joint probability distribution $p(x, y)$ of input variables x (the observed data values) and output variables y (determined values). Most unsupervised generative models, such as Boltzmann Machines, Deep Belief Networks, and the like, require complex samplers to train the generative model. However, the recently proposed technique of Generative Adversarial Networks (GANs) repurposes the min/max paradigm from game theory to generate images in an unsupervised manner. The GAN framework comprises a generator and a discriminator, where the generator acts as an adversary and tries to fool the discriminator by producing synthetic images based on a noise input, and the discriminator tries to differentiate synthetic images from true images.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising at least one processor and at least one memory, the at least one memory comprising instructions executed by the at least one processor to configure the processor to implement a Question Answering (QA) system. The method comprises training a generator neural network of a generative adversarial network (GAN) to generate a bag-of-ngrams (BoN) output representing unlabeled data for performing a natural language processing operation. The method further comprises the QA system obtaining a plurality of candidate answers to a natural language question, where each candidate answer comprises one or more ngrams. In addition, the method comprises generating, by the QA system, for each candidate answer in the plurality of candidate answers, a confidence score associated with the candidate answer based on a comparison of the one or more ngrams in the candidate answer to ngrams in the BoN output of the generator neural network of the GAN, where the confidence score represents a confidence that the candidate answer is a correct answer to the input natural language question. The method also comprises selecting, by the QA system, at least one final answer to the input natural language question from the plurality of candidate answers based on the confidence scores associated with the candidate answers, and outputting, by the QA system, the selected at least one final answer to the source computing device.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1B:
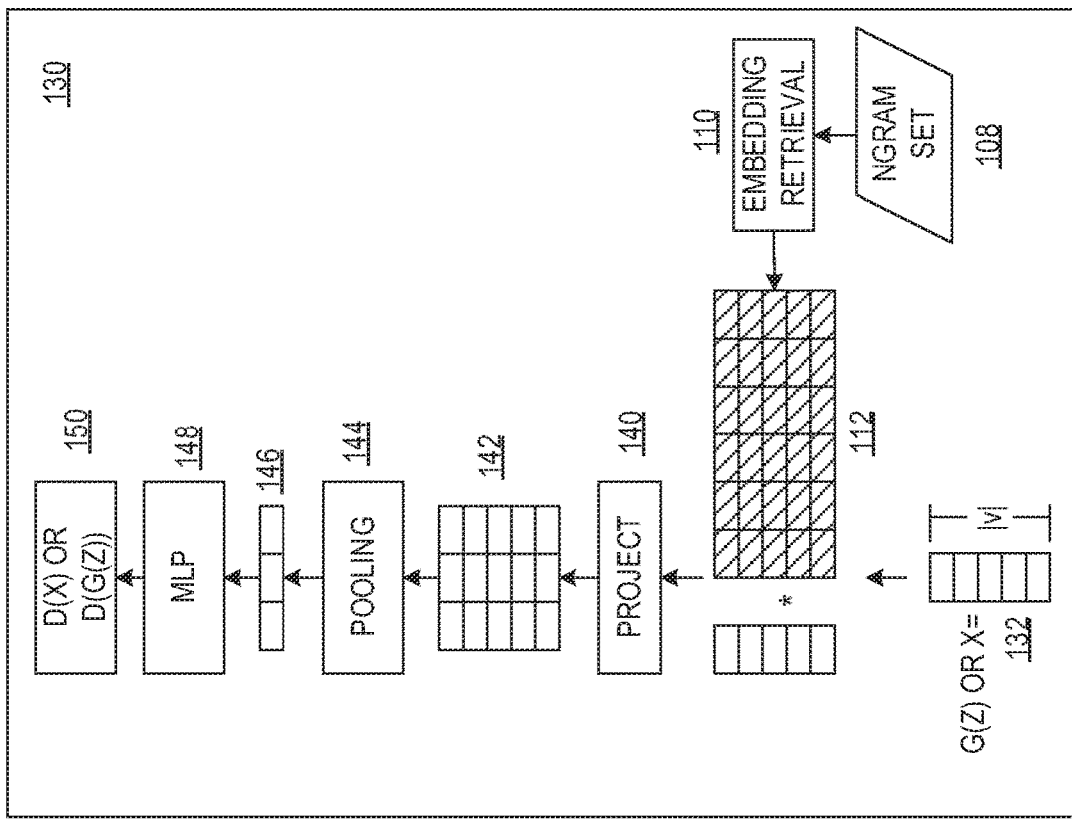
FIGS. 1A and 1B depict an example of a GANs based mechanism for generating a bag-of-ngrams (BoN) model in accordance with one illustrative embodiment.

The illustrative embodiments provide mechanisms for learning a bag of words/phrases model for performing natural language processing by utilizing a generative adversarial network approach. Much work has been devoted to learning statistical language models which estimate the word and phrase distribution in natural language. However, most of these statistical language models are trained discriminatively with a false independence assumption (between different segments of a document) at some point in order to make the learning manageable. The earliest attempts at providing statistical language modeling were performed in the field of speech recognition in the 1980s. Since then, these techniques have been applied to a myriad of areas, such as machine translation, speech-to-text synthesis, and the like. At the core, these works involve learning transition and emission probabilities of words or phrases in the vocabulary conditioned on the words or phrases seen in the history.

The early works on adversarial model training involved spam filtering, intrusion detection, terrorism detection, and computer security. For example, U.S. Pat. No. 8,989,297 proposed a routing protocol to transmit messages over a network of nodes, where an adversary controls the links between the node. The sender requests status reports from intermediate nodes to determine which nodes are malicious. In another work, U.S. Pat. No. 8,984,297, methods are used to identify inappropriate text in images to remove spam messages.

Recently there has been increased interest in training adversarial neural networks for unsupervised generative processes. These generative adversarial networks (GANs) are a class of artificial intelligence algorithms used in unsupervised machine learning, implemented by a system of two neural networks contesting with each other in a zero-sum game framework. GANs were introduced by Goodfellow et al., "Generative Adversarial Networks," Advances in Neural Information Processing Systems, pp. 2672-2680, 2014. As described therein, GANs are used to generate photographs or images that look authentic to human observers, by training a generator of the GAN to generate a synthetic photograph or image that fools the discriminator of the GAN into accepting it as an actual photograph or image, rather than a synthetic photograph or image generated from noise input. While trying to fool the discriminator, the generator learns the distribution of true photographs or images, i.e. the generator learns how to generate photographs or images that will fool the discriminator.

Since this work by Goodfellow et al., improvements have been made for generating better quality images, such as the DCGAN model, described in Radford et al., "Unsupervised Representation Learning with Deep Convolutional Generative Adversarial Networks," arXiv preprint arXiv:1511.06434 (2015), and LAPGAN model, described in Denton et al., "Deep Generative Image Models using Laplacian Pyramid of Adversarial Networks," Advances in Neural Information Processing Systems, pp. 1486-1495, 2015. However, these generative adversarial networks (GANs) models have been limited to performing such learning with regard to images.

The illustrative embodiments, provide mechanisms for adapting GANs model techniques, e.g., GANs, DCGAN, LAPGAN, or the like, to assist with natural language processing of natural language content. In particular, the illustrative embodiments implement generative adversarial networks (GANs) to learn word co-occurrences and their positions jointly in a portion of natural language content, e.g., a sentence, paragraph, document, or the like. The GANs model is used to generate a bag-of-ngrams, where the ngrams may be characters, words, phrases, or the any other portion of natural language content. The bag-of-ngrams is encoded as a probability distribution over a full vocabulary V. Ngrams that do not belong to the bag have a probability of zero, while ngrams in the bag have probability larger than zero.

Concretely, given a noise vector z, the generator G of the GANs is trained to produce a vector G(z) of size |V|, each value in the vector G(z), i.e. each vector slot, is set to a value indicative of whether or not a corresponding ngram is in the bag-of-ngrams or not, e.g., ngrams with values larger than zero are the ones in the bag-of-ngrams encoded in the vector G(z). The discriminator D of the GANs receives, as input, an encoded bag-of-ngrams, i.e. an encoded vector G(z) representing the bag-of-ngrams, and outputs a score between 0 and 1. The discriminator D may perform various evaluations on the bag-of-ngrams to calculate the output score, such as determining various statistical values or feature extractions including, but not limited to, term frequency, inverse document frequency, and the like. The higher the score, the more confident that the discriminator D is that the encoded bag-of-ngrams is generated from a true (actual) sentence/document and was not synthetically generated by the generator G from a noise input. A feedback mechanism may be provided to enable training of the generator G based on the output of the discriminator D such that the generator G learns how to fool the discriminator D and thereby generate bag-of-ngrams outputs that closely resemble bag-of-ngram representations of actual portions of natural language content.

The result, is that the bag-of-ngram representation that may be generated from the trained generator G of the GAN provides a large unlabeled set of data that may be used to perform natural language processing operations. For example, if conditional generation is performed, the bag-of-ngrams model (referred to hereafter as a BoN model) may be used to classify a given text, select candidate answers for answering an input question to a question answering (QA) system, textual entailment operations, and the like. In one illustrative embodiment, the bag-of-ngram representation generated by the trained conditional generator G based on a given input question and a noise input vector may be used to select an answer from a set of candidate answers generated by a QA system by comparing the BoN model to the ngrams in the candidate answers, e.g., BoN representation of the candidate answer. The candidate answer having a highest degree of matching with the BoN model generated by the conditional GAN may be selected as the correct answer for the QA system.

The GANs based mechanism for generating a bag-of-ngrams (BoN) model for use in performing natural language processing (NLP) operations has a number of advantages. First, it is an end-to-end differentiable solution and can be trained with stochastic gradient descent to quickly arrive at a trained generator. Secondly, for each ngram, the generator will simply output a numerical value informing whether or not the ngram is in the BoN being generated. This is simpler and easier to optimize than trying to generate the sentence itself by directly generating a sequence of word embeddings (WEs).

In addition, since the generator G is generating a BoN model, the generation process can be performed in parallel, i.e., the probability of each word being in a BoN is computed in parallel given the input noise vector. Likewise, most operations (up to the last layer) in the discriminator can be performed in parallel.

Added to these benefits is the fact that the use of a BoN model is sufficient in many NLP tasks to obtain accurate and reliable results and thus, a mechanism for generating a BoN model from noise input without having to process a large amount of actual natural language content is a beneficial tool that greatly reduces the time and resources needed to generate an accurate model. Moreover, the framework of the GAN based mechanisms of the illustrative embodiments can be easily adapted to perform different NLP tasks.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, the present invention provides a methodology, apparatus, system and computer program product for configuring and implementing a generative adversarial network (GAN) model to generate a bag-of-ngrams (BoN) model for performing natural language processing (NLP) operations, as well as a NLP methodology, apparatus, system, and computer program product implementing a trained GAN to perform a NLP operation. With the mechanisms of the illustrative embodiments, a bag-of-ngrams is encoded as a vector of size V, i.e., the ngrams vocabulary size. An ngram that does not belong to the encoded bag-of-ngrams (BoN) has a zero value in its corresponding position, while ngrams in the BoN have a value larger than zero. If the vector is normalized, these values may be interpreted as the probability of each ngram, e.g., word, belonging to the BoN.

The actual non-normalized values in the vector slots of the BoN vector, each slot corresponding to an ngram, may be calculated in a variety of different ways. For example, the value may be the frequency of the corresponding ngram appearing in the input. The value may be a co-occurrence metric of the ngram. In some illustrative embodiments, one informative way to encode the ngrams is to use the Term Frequency-Inverse Document Frequency (TF-IDF) of the ngrams as the values in the encoding vector. Any metric and corresponding known or later developed methodology for representing the degree of representation and/or influence of the ngram in an input may be used to generate the non-normalized values of the BoN vector without departing from the spirit and scope of the present invention. For purposes of illustration herein, the illustrative embodiments will assume that the values of the vector slots in the BoN vector are calculated as the TF-IDF of the corresponding ngram which is then normalized to represent a probability of the corresponding ngram belonging to the BoN.

Figure 1A:
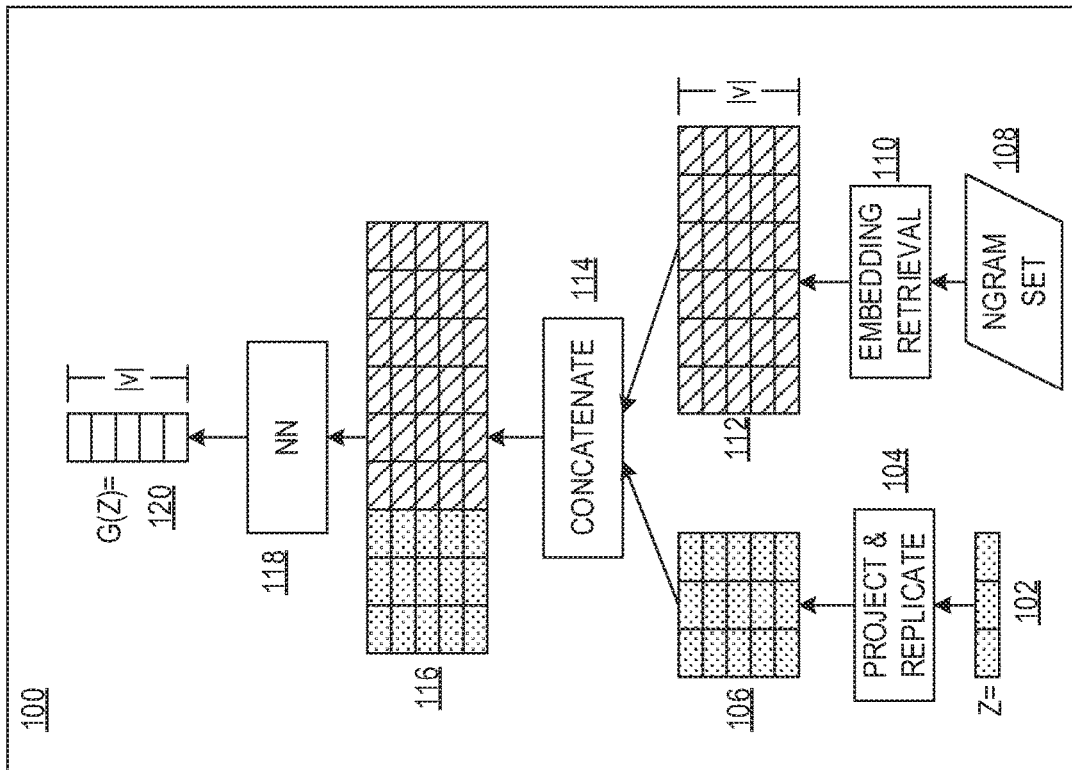

FIGS. 1A and 1B depict an example of a GAN based mechanism for generating a bag-of-ngrams (BoN) model in accordance with one illustrative embodiment. FIG. 1A is a representation of the generator of the GANs while FIG. 1B is a representation of the discriminator of the GANs.

As shown in FIGS. 1A and 1B, given a noise vector z 102 as input (e.g., a vector of numerical values in the range [0,1] that are sampled from a uniform distribution), the generator neural network (generator) G 100 is trained to produce a bag-of-ngrams G(z) 120, which is encoded using the approach previously described. The discriminator neural network (discriminator) D 130 receives as input an encoded bag-of-ngrams 132, which may be the bag-of-ngrams G(z) 120, for example, or a bag-of-ngrams obtained from an actual (true) portion of natural language text, and outputs an output value D(G(z)) 150 a score between 0 and 1. The generator G 100 and discriminator D 130 may be implemented as software and/or hardware logic of one or more computing devices, where the logic may be trained, for example, using a stochastic gradient descent algorithm, or other suitable training process for the desired implementation.

In the generator G 100, the noise vector z (of size m) 102 is normally created by uniformly sampling m numerical values in the interval [0,1], where m may be any suitable number of numerical values, e.g., 50 or 100. Each numerical value in the uniform distribution of interval [0,1] has an equal chance of being selected for inclusion in the noise vector z through sampling. Another way in which the noise vector z may be generated is to sample from a normal distribution with 0 mean and standard deviation 1, for example.

This noise vector z is then projected and replicated, by projection and replication logic 104, |V| times to form the matrix Z (of size |V|×m) data structure 106. The projection is a fully connected neural network layer followed by a non-linearity such as the ReLU. Each row in the matrix Z 106 is the same, i.e. each row corresponds to the same vector z which has been replicated to generate the matrix Z. Projection and replication are known mathematical operations and thus, the details of how projection and replication are accomplished by the projection and replication logic 104 will not be set forth herein.

The generator then retrieves the embedding 110 of each ngram in the vocabulary. The vocabulary 108, comprising the ngram set, is a data structure of all the recognized ngrams used in the particular natural language processing system (not shown) in which the GANs is being implemented. Each of the ngrams in the vocabulary 108 may be represented as vector representations, i.e. embeddings, such as one-hot vector representations of the words in which the vector comprises a slot for every word in the vocabulary 108 and a value of "1" is present in the slot corresponding to the word and all other slots are set to a value of "0". In general, the embedding of a ngram consists of the concatenation of the word embeddings of the different words in that ngram, e.g., a single word ngram will have the single word embedding for that word. Consider an example in which bigrams are being used, i.e. a combination of two words, and that the word embedding size is d (where the embedding size is a hyperparameter defined empirically, such as 300 or the like), this process creates a matrix A 112 of size |V|×2*d. Each embedding may be represented as a row in the resulting matrix A 112.

The generator G 100, using concatenation logic 114, then concatenates the matrices A and Z to generate the concatenation matrix 116. As shown in FIG. 1A, the concatenation matrix 116 comprises rows having a first portion (non-shaded) of each row corresponding to the projected and replicated matrix Z 106, and a second portion (shaded) of each row corresponding to the embedded ngram matrix A.

Each row [projected z; n-gram embedding] of the concatenation matrix 116 is input to a neural network (NN) 118, which in some illustrative embodiments may be a multi-layer perceptron (MLP) that uses a Rectified Linear Unit (ReLU) as the activation function of the output layer, although in other embodiments other activation functions may be utilized, such as sigmoid activation functions or hyperbolic tangent functions, or the like. The role of the NN is to output a number that determines how likely the n-gram is to be present in the BoN represented by z. Since the neural network is applied to each one of the rows of the concatenated matrix, the neural network will output |V| numbers, which can be interpreted as a vector G(z), that represents the output BoN. In other words, the noise vector input z is mapped from the z space to the BoN model space. The output vector G(z) (of size |V|) is them normalized so that the sum of its values is 1. As a result, the output vector G(z) represents a probability distribution over the ngrams of the vocabulary 108. In one illustrative embodiment, this is a probability distribution based on TF-IDF values of the ngrams.

As shown in FIG. 1B, in the discriminator D 130, an input of a BoN model G(z) 132 is received, which may be the BoN model G(z) 120 from the generator G 100 or a BoN generated by means of computing the TF-IDF vector from a real (actual) natural language text. In addition, the embeddings 110, e.g., word embedding (WEs) in the depicted example, for the ngrams of the vocabulary 108 are retrieved to form a matrix of n-gram embeddings B 112, similar to the corresponding operation performed in the generator G 100.

After retrieving the ngram embeddings 110 and generating the matrix B 112, logic of the discriminator 130 multiplies the input encoded ngram in the BoN 132 by the ngram embeddings matrix B 112. It should be noted that after this multiplication operation, the embeddings of ngrams that are not in the input encoded BoN 132 will all have zero values. The result of this multiplication is projected by discriminator projection logic 140 to generate an output matrix 142. The projection can be seen as a fully connected neural network layer followed by a non-linearity such as the ReLU, e.g., X=ReLU(B·W) where W is a matrix of parameters that is learned during training and each row of X is a projection of a row in the input matrix.

Next, the discriminator logic 144 performs sum pooling, which creates a fixed-sized vector r 146. Neural networks, such as the MLP 148, typically operate on a single vector as an input. The sum pooling or max pooling is a mechanism by which to condense all the information for determining whether or not the input BoN is from a real document or not into a single vector that may be processed by the NN of the discriminator. Thus the fixed-size vector r 146 may be considered a sort of summary of the BoN information, e.g., a feature vector, as a single vector that can be processed by the MLP 148. The vector r 146 is given as input to a neural network 148, which again may be a MLP, whose output layer uses a sigmoid activation function. The neural network 148 generates an output of a 0 or 1 indicating whether or not the discriminator 130 believes the input BoN model G(z) represents an actual portion of natural language content or is synthetic.

The proposed GAN based architecture shown in FIGS. 1A and 1B can be easily adapted to generate bag-of-ngrams conditioned in other texts, e.g., other questions, or classes, e.g., sentiment classes positive/negative. For example, one may want to generate a BoN that has positive sentiment. For such a purpose, the conditional GAN may be trained where the generator also receives as input the "class" of the BoN.

Figures 2A, 2B:
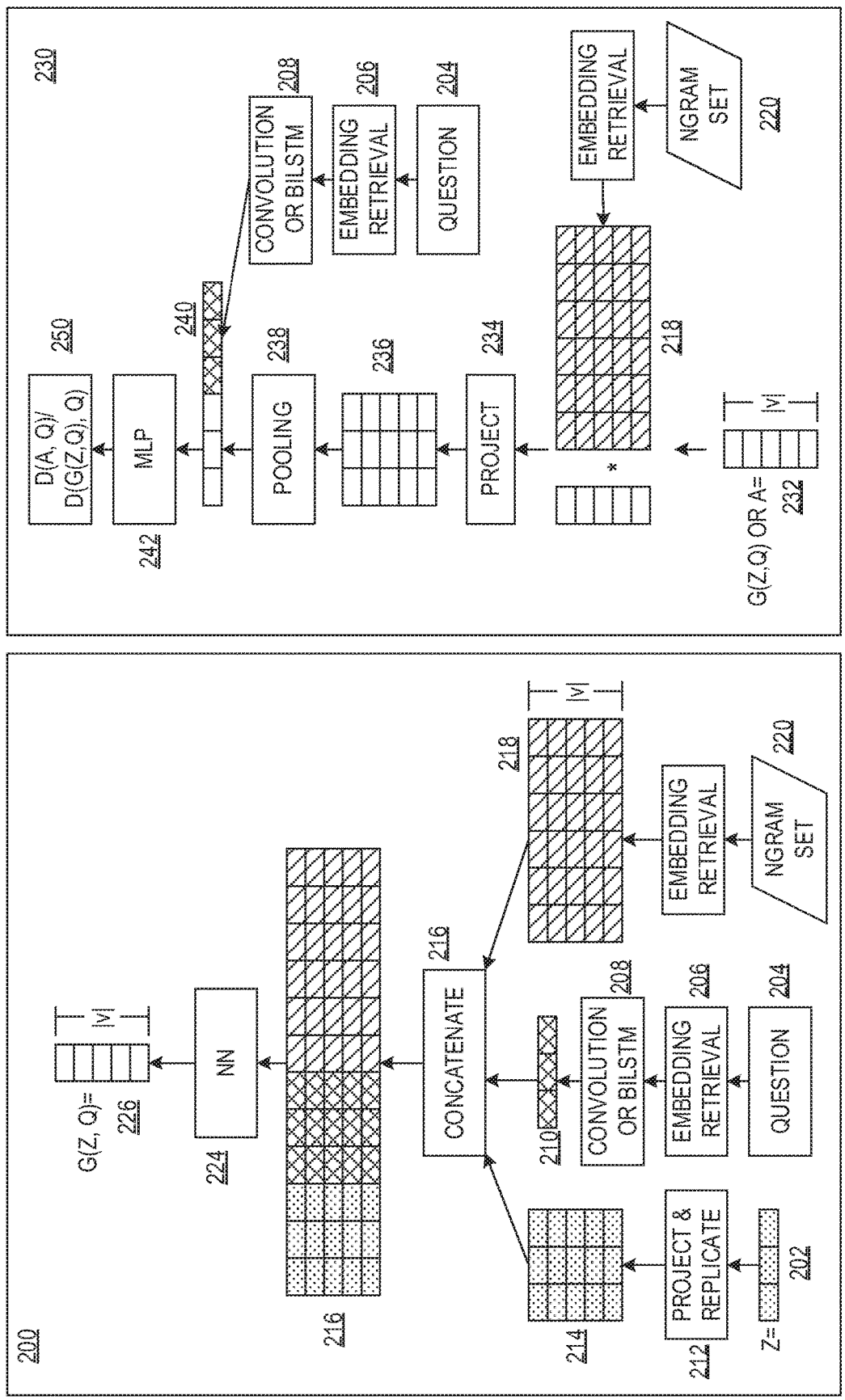
FIGS. 2A and 2B depict an example diagram of a GANs architecture configured for answer selection in accordance with one illustrative embodiment.

In one illustrative embodiment, the GANs based architecture may be used to implement a bag-of-ngrams (BoN) model to assist with an answer selection task of a Question Answering (QA) system. FIGS. 2A and 2B depict an example diagram of a GANs architecture configured for answer selection in accordance with one illustrative embodiment. In such an illustrative embodiment, the GAN mechanism 200 can be trained to generate the bag-of-ngrams of the answer, conditioned in both z 202 and the word embeddings (WEs) 206 of the input question q 204. This conditioning may be accomplished by concatenating, by concatenation logic 216, the vector representation of q 210, which may be generated using a recurrent neural network (RNN) 208 to the matrix Z 214 generated by projection and replication logic 212 and the word embeddings matrix V 218 of the vocabulary 220.

The resulting concatenated matrix 222 comprises rows having a first portion corresponding to the corresponding rows in the matrix Z 214, a second portion corresponding to the embeddings vector 210 of the question q 204, and a third portion corresponding to the n-gram embedding matrix 218 of the vocabulary 220. The neural network 224 processes the concatenation matrix 222 in a similar manner as previously described above, to generate the output BoN model G(z,q) 226 representing the probability distribution over the ngrams of the vocabulary 220 conditioned by the noise input z 202 and the embeddings vector 210 of the input question. Thus, where before in FIG. 1A the neural network receives a feature vector of the type [z; n-gram embedding], the neural network 224 receives a feature vector of [z; question embedding; n-gram embedding]. This means that the score that the neural network 224 generates for a given n-gram now also depends on the features (embedding) of the question.

As shown in FIG. 2B, in the discriminator D 230, an input of a BoN model G(z,q) 232 is received, which may be the BoN model G(z,q) 226 from the generator G 200. In addition, the word embeddings (WEs) 218 for the ngrams of the vocabulary 220 are retrieved, similar to the corresponding operation performed in the generator G 200. The n-gram embedding matrix 218 is again generated. After retrieving the ngram embeddings 218 and generating the n-gram embedding matrix 218, logic of the discriminator 230 multiplies the encoded ngram in the BoN model G(z, q) by the ngram embeddings in the vector matrix IV 218. It should be noted that after this multiplication operation, the embeddings of ngrams that are not in the input encoded BoN model G(z, q) will all have zero values. The result of this multiplication is projected by discriminator projection logic 234 to generate an output matrix 236.

Next, the discriminator logic 238 performs sum pooling, which creates a fixed-sized vector r 240. The fixed-sized vector r 240 comprises a first portion from the pooling logic 238, and a second portion corresponding to the vector representation 210 of the word embedding of the input question 204. The vector r 240 is given as input to a neural network 242, which again may be a MLP, whose output layer uses a sigmoid function. The neural network 242 generates an output of a 0 or 1 indicating whether or not the discriminator 230 believes the input BoN model G(z, q) represents an actual answer to the input question or not.

The BoN model G(z, q) 232 is used to select a candidate answer to the input question q 204 generated by a QA system. That is, the operation outlined in FIGS. 2A and 2B essentially has the GAN mechanism learn the bag-of-ngrams, e.g., bag-of-words, that corresponds to an answer to the input question q 204. As a result, the BoN model 232 for the answer to the input question q 204 may be used to compare the ngrams in the BoN model 232 to the ngrams in a candidate answer. If there is a sufficient match (for instance using cosine similarity) between the BoN model 232 ngrams and the ngrams of the candidate answer, then the candidate answer may be selected as an answer for the input question q 204. Alternatively, the comparison may be used as a metric for ranking candidate answers relative to one another such that those candidate answers having a higher degree of matching with the BoN model 232 may be ranked relatively higher than candidate answers having a lower degree of matching with the BoN model 232. Such ranking may be performed alone or in combination with evaluations of other criteria, such as supporting evidence analysis, for ranking candidate answers relative to one another for selection of a final answer to the input question.

It should be appreciated that the GAN mechanism of the illustrative embodiments may be adapted for implementation with various other types of semantic matching tasks. For example, the GAN mechanism may be adapted to perform text modeling of tasks such textual entailment and paraphrase detection. Both cases can be formulated similarly to the answer selection cases, where we condition the generator in the input sentence and use the generated BoN to compare with the target sentence.

Thus, as noted above, the illustrative embodiments provide a GAN based mechanism that provides an end-to-end differentiable solution that may be trained with stochastic gradient descent. The GAN based mechanism is easy to optimize due to the fact that the generator having to only indicate whether or not an ngram is in the bag-of-ngrams or not. The generation and discrimination processes of the GAN based mechanism can be easily parallelizable since there is no dependency in the computation of each ngram in the bag-of-ngrams. Moreover, the GAN based mechanism is easily adaptable to various natural language processing tasks such as text classification, answer selection, and textual entailment.

Figure 3:
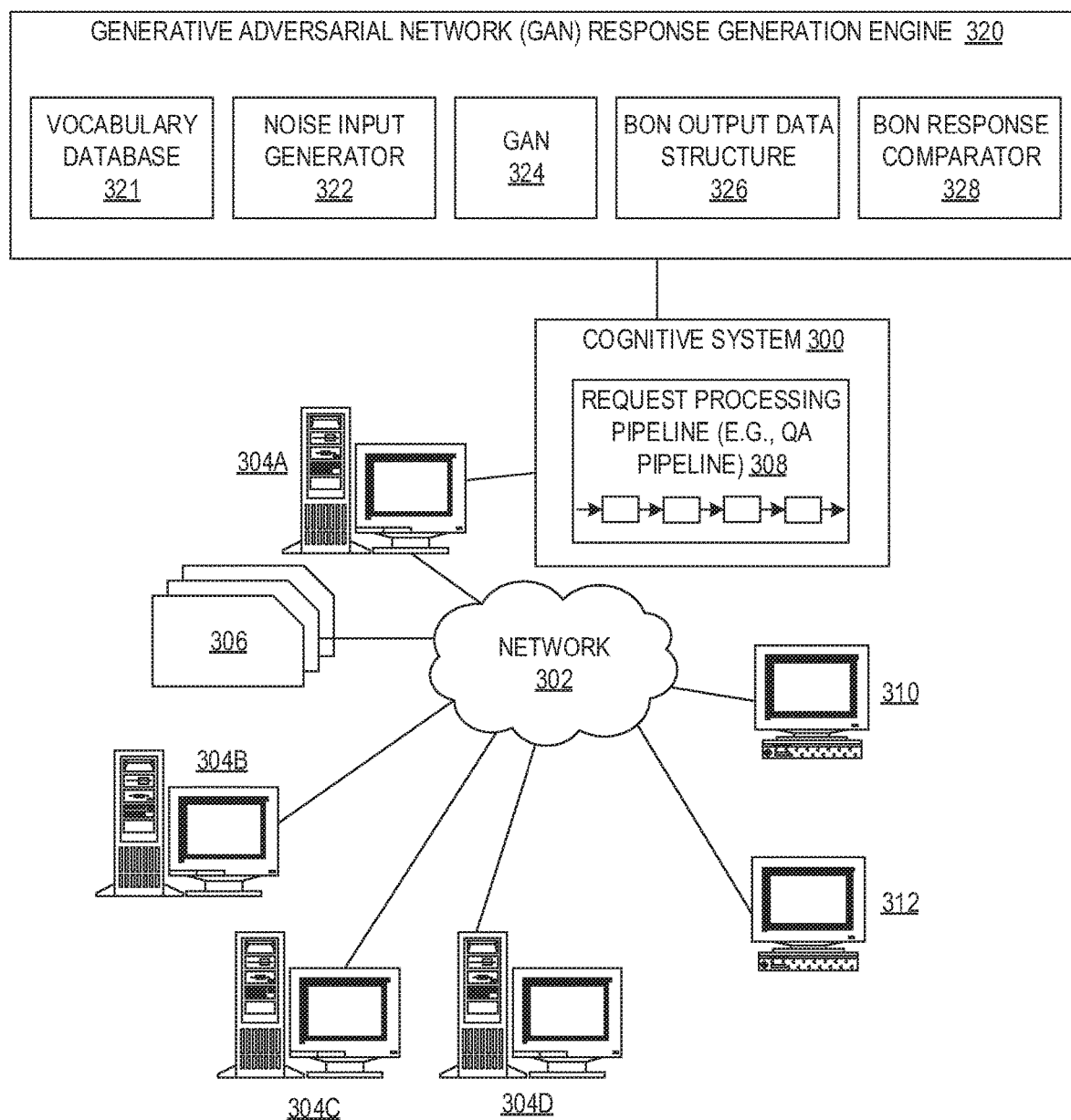
FIG. 3 depicts a schematic diagram of one illustrative embodiment of a cognitive system in a computer network.
Figure 4:
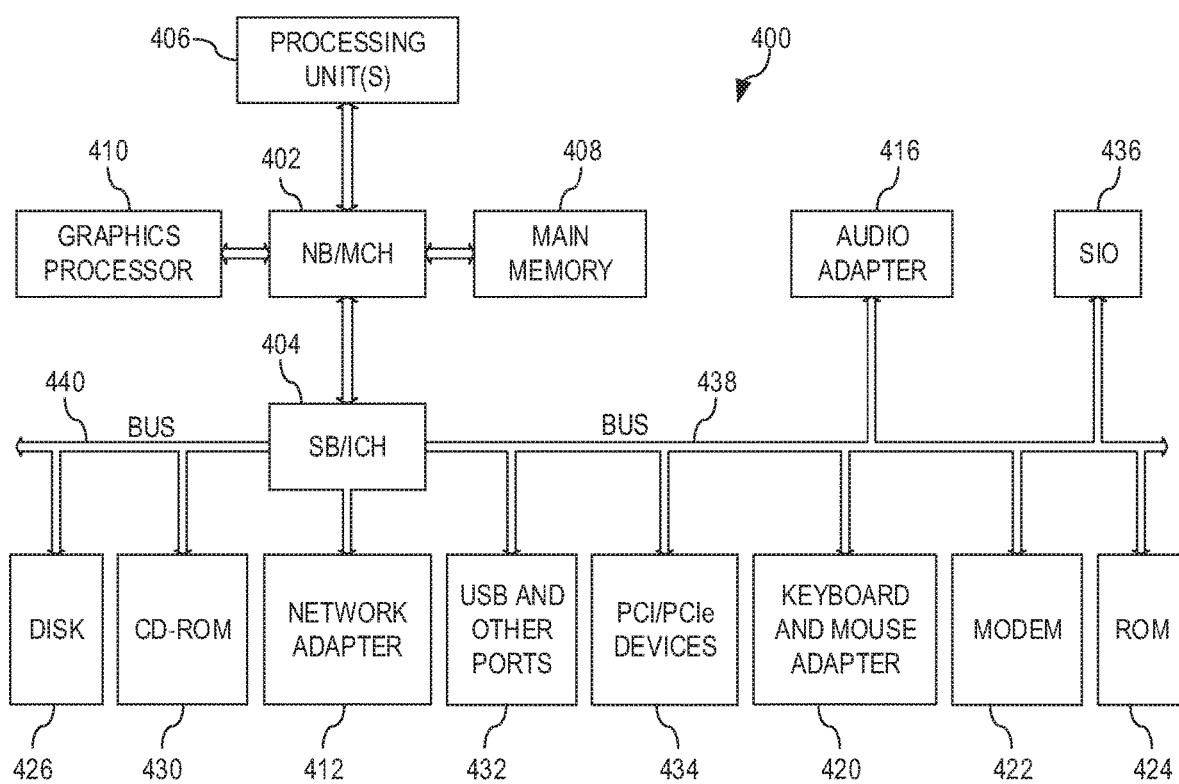
FIG. 4 is a block diagram of an example data processing system in which aspects of the illustrative embodiments are implemented.
Figure 5:
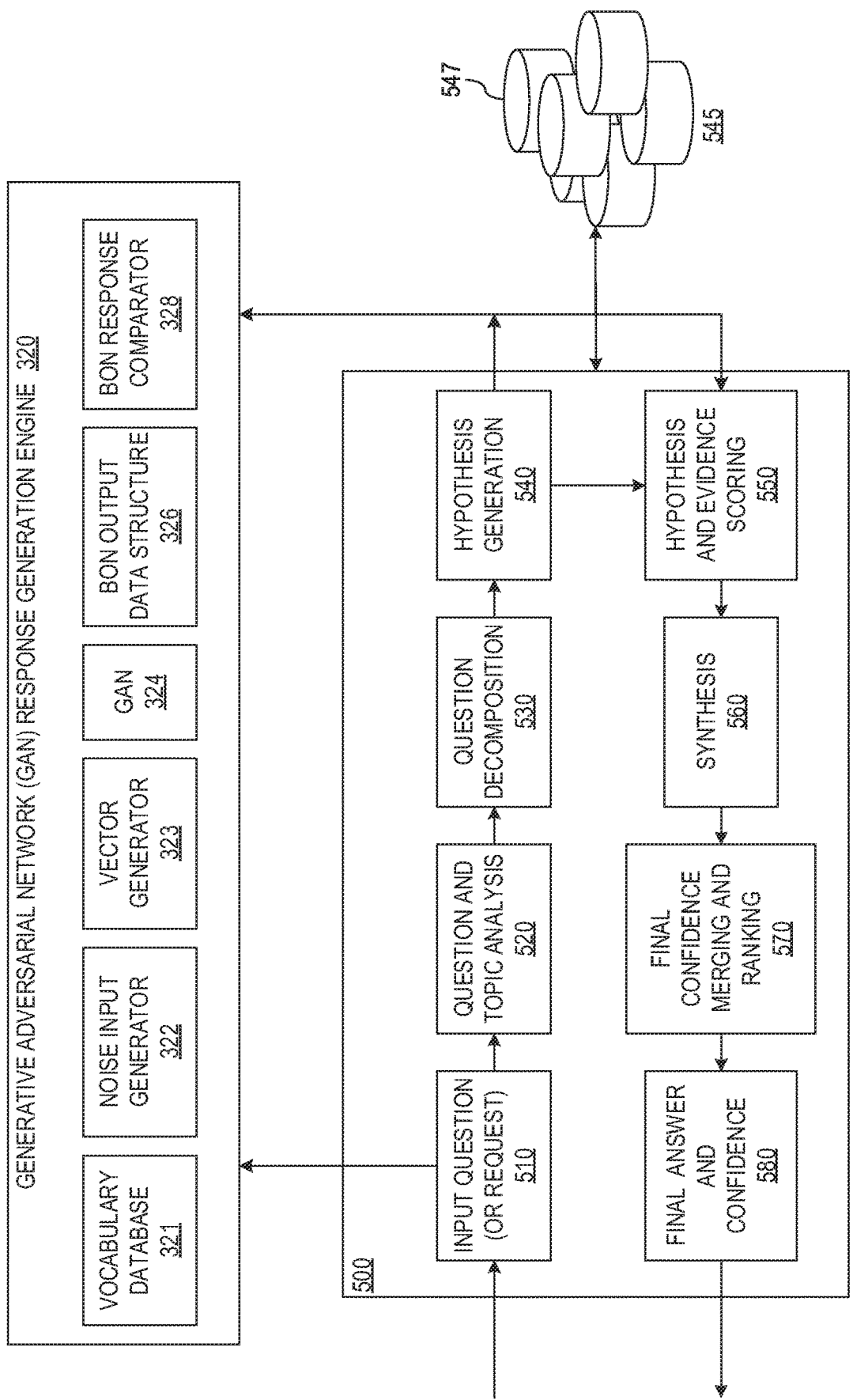
FIG. 5 illustrates a cognitive system processing pipeline for processing a natural language input to generate a response or result in accordance with one illustrative embodiment.

As is clear from the above, the present invention is specifically directed to implementing a computer based tool, i.e. a generative adversarial network (GAN) mechanism, to perform computer based natural language processing of a portion of natural language content. Thus, the illustrative embodiments may be utilized in many different types of data processing environments. In order to provide a context for the description of the specific elements and functionality of the illustrative embodiments, FIGS. 3-5 are provided hereafter as example environments in which aspects of the illustrative embodiments may be implemented. It should be appreciated that FIGS. 3-5 are only examples and are not intended to assert or imply any limitation with regard to the environments in which aspects or embodiments of the present invention may be implemented. Many modifications to the depicted environments may be made without departing from the spirit and scope of the present invention.

FIGS. 3-5 are directed to describing an example cognitive system for processing natural language input, such as a request, a question, a portion of natural language text, or the like, which implements a request processing pipeline, such as a Question Answering (QA) pipeline (also referred to as a Question/Answer pipeline or Question and Answer pipeline) for example, request processing methodology, and request processing computer program product with which the mechanisms of the illustrative embodiments are implemented. These requests may be provided as structure or unstructured request messages, natural language questions, or any other suitable format for requesting an operation to be performed by the cognitive system. As described in more detail hereafter, the particular application that is implemented in the cognitive system of the present invention is an application for question answering and thus, the request processing pipeline is assumed to be a QA pipeline that operates on an input question and generates an answer to the input question.

It should be appreciated that the cognitive system, while shown as having a single request processing pipeline in the examples hereafter, may in fact have multiple request processing pipelines. Each request processing pipeline may be separately trained and/or configured to process requests associated with different domains or be configured to perform the same or different analysis on input requests (or questions in implementations using a QA pipeline), depending on the desired implementation. For example, in some cases, a first request processing pipeline may be trained to operate on input requests (or questions) directed to a medical domain, while a second request processing pipeline may be trained to operate on input request, e.g., input questions, directed to a financial domain. In other cases, for example, the request processing pipelines may be configured to provide different types of cognitive functions or support different types of applications, such as one request processing pipeline being used for requests/questions directed to treatment recommendations for patients, while another request processing pipeline may process requests/questions directed to drug interaction information or the like.

Moreover, each request processing pipeline may have their own associated corpus or corpora that they ingest and operate on, e.g., one corpus for medical treatment documents and another corpus for financial domain related documents in the above examples. In some cases, the request processing pipelines may each operate on the same domain of input questions but may have different configurations, e.g., different annotators or differently trained annotators, such that different analysis and potential answers are generated. The cognitive system may provide additional logic for routing input questions to the appropriate request processing pipeline, such as based on a determined domain of the input request, combining and evaluating final results generated by the processing performed by multiple request processing pipelines, and other control and interaction logic that facilitates the utilization of multiple request processing pipelines.

As noted above, one type of request processing pipeline with which the mechanisms of the illustrative embodiments may be utilized is a Question Answering (QA) pipeline. The description of example embodiments of the present invention hereafter will utilize a QA pipeline as an example of a request processing pipeline that may be augmented to include mechanisms in accordance with one or more illustrative embodiments. It should be appreciated that while the present invention will be described in the context of the cognitive system implementing one or more QA pipelines that operate on an input question, the illustrative embodiments are not limited to such. Rather, the mechanisms of the illustrative embodiments may operate on requests that are not posed as "questions" but are formatted as requests for the cognitive system to perform cognitive operations on a specified set of input data using the associated corpus or corpora and the specific configuration information used to configure the cognitive system. For example, rather than asking a natural language question of "What diagnosis applies to patient P?", the cognitive system may instead receive a request of "generate diagnosis for patient P," or the like. It should be appreciated that the mechanisms of the QA system pipeline may operate on requests in a similar manner to that of input natural language questions with minor modifications. In fact, in some cases, a request may be converted to a natural language question for processing by the QA system pipelines if desired for the particular implementation.

As noted above, the example embodiments set forth herein are directed to a QA system and a QA pipeline operating on an input natural language question to generate an answer to the input question by performing natural language processing and cognitive analysis of the input question and the corpus/corpora of available information. Thus, it is important to first have an understanding of how cognitive systems and question and answer creation in a cognitive system implementing a QA pipeline is implemented before describing how the mechanisms of the illustrative embodiments are integrated in and augment such cognitive systems and request processing pipeline, or QA pipeline, mechanisms. It should be appreciated that the mechanisms described in FIGS. 3-5 are only examples and are not intended to state or imply any limitation with regard to the type of cognitive system mechanisms with which the illustrative embodiments are implemented. Many modifications to the example cognitive system shown in FIGS. 3-5 may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, for example, and machine learning logic, which may be provided as specialized hardware, software executed on hardware, or any combination of specialized hardware and software executed on hardware. The logic of the cognitive system implements the cognitive operation(s), examples of which include, but are not limited to, question answering, identification of related concepts within different portions of content in a corpus, intelligent search algorithms, such as Internet web page searches, for example, medical diagnostic and treatment recommendations, and other types of recommendation generation, e.g., items of interest to a particular user, potential new contact recommendations, or the like.

IBM Watson™ is an example of one such cognitive system which can process human readable language and identify inferences between text passages with human-like high accuracy at speeds far faster than human beings and on a larger scale. In general, such cognitive systems are able to perform the following functions:

Navigate the complexities of human language and understanding

Ingest and process vast amounts of structured and unstructured data

Generate and evaluate hypothesis

Weigh and evaluate responses that are based only on relevant evidence

Provide situation-specific advice, insights, and guidance

Improve knowledge and learn with each iteration and interaction through machine learning processes Enable decision making at the point of impact (contextual guidance)

Scale in proportion to the task

Extend and magnify human expertise and cognition

Identify resonating, human-like attributes and traits from natural language

Deduce various language specific or agnostic attributes from natural language

High degree of relevant recollection from data points (images, text, voice) (memorization and recall)

Predict and sense with situational awareness that mimic human cognition based on experiences Answer questions based on natural language and specific evidence In one aspect, cognitive systems provide mechanisms for answering questions posed to these cognitive systems using a Question Answering pipeline or system (QA system) and/or process requests which may or may not be posed as natural language questions. The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e. candidate answer, is inferred by the question. This process is repeated for each of the candidate answers until the QA pipeline identifies candidate answers that surface as being significantly stronger than others and thus, generates a final answer, or ranked set of answers, for the input question.

FIG. 3 depicts a schematic diagram of one illustrative embodiment of a cognitive system 300 implementing a request processing pipeline 308, which in some embodiments may be a question answering (QA) pipeline, in a computer network 302. For purposes of the present description, it will be assumed that the request processing pipeline 308 is implemented as a QA pipeline that operates on structured and/or unstructured requests in the form of input questions. One example of a question processing operation which may be used in conjunction with the principles described herein is described in U.S. Patent Application Publication No. 2011/0125734, which is herein incorporated by reference in its entirety. The cognitive system 300 is implemented on one or more computing devices 304A-D (comprising one or more processors and one or more memories, and potentially any other computing device elements generally known in the art including buses, storage devices, communication interfaces, and the like) connected to the computer network 302. For purposes of illustration only, FIG. 3 depicts the cognitive system 300 being implemented on computing device 304A only, but as noted above the cognitive system 300 may be distributed across multiple computing devices, such as a plurality of computing devices 304A-D. The network 302 includes multiple computing devices 304A-D, which may operate as server computing devices, and 310-312 which may operate as client computing devices, in communication with each other and with other devices or components via one or more wired and/or wireless data communication links, where each communication link comprises one or more of wires, routers, switches, transmitters, receivers, or the like. In some illustrative embodiments, the cognitive system 300 and network 302 enables question processing and answer generation (QA) functionality for one or more cognitive system users via their respective computing devices 310-312. In other embodiments, the cognitive system 300 and network 302 may provide other types of cognitive operations including, but not limited to, request processing and cognitive response generation which may take many different forms depending upon the desired implementation, e.g., cognitive information retrieval, training/instruction of users, cognitive evaluation of data, or the like. Other embodiments of the cognitive system 300 may be used with components, systems, subsystems, and/or devices other than those that are depicted herein.

The cognitive system 300 is configured to implement a request processing pipeline 308 that receive inputs from various sources. The requests may be posed in the form of a natural language question, natural language request for information, natural language request for the performance of a cognitive operation, or the like. For example, the cognitive system 300 receives input from the network 302, a corpus or corpora of electronic documents 306, cognitive system users, and/or other data and other possible sources of input. In one embodiment, some or all of the inputs to the cognitive system 300 are routed through the network 302. The various computing devices 304A-D on the network 302 include access points for content creators and cognitive system users. Some of the computing devices 304A-D include devices for a database storing the corpus or corpora of data 306 (which is shown as a separate entity in FIG. 3 for illustrative purposes only). Portions of the corpus or corpora of data 306 may also be provided on one or more other network attached storage devices, in one or more databases, or other computing devices not explicitly shown in FIG. 3. The network 302 includes local network connections and remote connections in various embodiments, such that the cognitive system 300 may operate in environments of any size, including local and global, e.g., the Internet.

In one embodiment, the content creator creates content in a document of the corpus or corpora of data 306 for use as part of a corpus of data with the cognitive system 300. The document includes any file, text, article, or source of data for use in the cognitive system 300. Cognitive system users access the cognitive system 300 via a network connection or an Internet connection to the network 302, and input questions/requests to the cognitive system 300 that are answered/processed based on the content in the corpus or corpora of data 306. In one embodiment, the questions/requests are formed using natural language. The cognitive system 300 parses and interprets the question/request via a pipeline 308, and provides a response to the cognitive system user, e.g., cognitive system user 310, containing one or more answers to the question posed, response to the request, results of processing the request, or the like. In some embodiments, the cognitive system 300 provides a response to users in a ranked list of candidate answers/responses while in other illustrative embodiments, the cognitive system 300 provides a single final answer/response or a combination of a final answer/response and ranked listing of other candidate answers/responses.

The cognitive system 300 implements the pipeline 308 which comprises a plurality of stages for processing an input question/request based on information obtained from the corpus or corpora of data 306. The pipeline 308 generates answers/responses for the input question or request based on the processing of the input question/request and the corpus or corpora of data 306. The pipeline 308 will be described in greater detail hereafter with regard to FIG. 5.

In some illustrative embodiments, the cognitive system 300 may be the IBM Watson™ cognitive system available from International Business Machines Corporation of Armonk, N.Y., which is augmented with the mechanisms of the illustrative embodiments described hereafter. As outlined previously, a pipeline of the IBM Watson™ cognitive system receives an input question or request which it then parses to extract the major features of the question/request, which in turn are then used to formulate queries that are applied to the corpus or corpora of data 306. Based on the application of the queries to the corpus or corpora of data 306, a set of hypotheses, or candidate answers/responses to the input question/request, are generated by looking across the corpus or corpora of data 306 for portions of the corpus or corpora of data 306 (hereafter referred to simply as the corpus 306) that have some potential for containing a valuable response to the input question/response (hereafter assumed to be an input question). The pipeline 308 of the IBM Watson™ cognitive system then performs deep analysis on the language of the input question and the language used in each of the portions of the corpus 306 found during the application of the queries using a variety of reasoning algorithms.

The scores obtained from the various reasoning algorithms are then weighted against a statistical model that summarizes a level of confidence that the pipeline 308 of the IBM Watson™ cognitive system 300, in this example, has regarding the evidence that the potential candidate answer is inferred by the question. This process is be repeated for each of the candidate answers to generate ranked listing of candidate answers which may then be presented to the user that submitted the input question, e.g., a user of client computing device 310, or from which a final answer is selected and presented to the user. More information about the pipeline 308 of the IBM Watson™ cognitive system 300 may be obtained, for example, from the IBM Corporation website, IBM Redbooks, and the like. For example, information about the pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As shown in FIG. 3, the cognitive system 300 is further augmented, in accordance with the mechanisms of the illustrative embodiments, to include logic implemented in specialized hardware, software executed on hardware, or any combination of specialized hardware and software executed on hardware, for implementing a generative adversarial network (GAN) answer ranking engine 320. The GAN answer ranking engine 320 may operate in conjunction with the cognitive system 300 for use in selecting/generating a response to a request processed by the request processing pipeline 308, e.g., an answer to an input question, submitted by a client computing device 310, 312. For example, a user of a client computing device 310 may submit a natural language question to the cognitive system 300 executing on the server 304A, via the network 302. The input question is processed via the pipeline 308 which operates in conjunction with the GAN response generation engine 320 to generate candidate answers to the input question and select a candidate answer based on a ranking of candidate answers. In accordance with the illustrative embodiments, this ranking may be based, at least partially, on the bag-of-ngrams generated by the GAN response generation engine 320.

As shown in FIG. 3, the GAN response generation engine 320 comprises a noise input generator 322, the GAN logic 324, a bag-of-ngrams (BoN) output data structure 326, and a BoN response comparator 328. The noise input generator 322 generates the noise vector z for training/runtime operation of the GAN 324. In a training mode of operation 324 operates on the noise input vector z generated by the noise input generator 322, along with the word embedding matrix of the vocabulary V, to train the generator of the GAN 324 to generate BoN vector outputs G(z) that fool the discriminator of the GAN 324, as previously described above with regard to FIGS. 1A and 1B. During runtime operation, such as illustrated in FIGS. 2A and 2B above, the GAN 324 utilizes the noise input vector z from the noise input generator 322, along with the word embedding vector representation of the input request (e.g., natural language question), and the word embedding matrix of the vocabulary V based on the ngrams in the vocabulary database 321, to generate a bag-of-ngrams representing the ngrams of an actual answer to the input question for comparison to the ngrams of candidate answers generated by the pipeline 308.

During operation, the GAN 324, based on the input request to the pipeline 308, generates a BoN output data structure 326, e.g., G(z, q) in FIGS. 2A and 2B. The BoN output data structure 326 is input to the BoN response comparator 328 which compares the BoN output data structure 326 to the ngrams associated with candidate responses, e.g., candidate answers, generated by the pipeline 308. A degree of matching between the ngrams in the BoN output data structure 326 and the ngrams of each of the candidate responses is calculated and associated with each of the candidate responses. This calculated BoN correspondence score for each candidate response may be used alone, or in combination with other candidate response ranking criteria, to generate a relative ranking of the candidate responses. One or more final response(s) may be selected based on this relative ranking, e.g., a highest ranking candidate response is selected as a final response. The selected response(s) may then be returned to the requestor, e.g., the client computing device 310 from which the request, e.g., input question, was received.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 4 is provided as an example of one type of data processing system in which aspects of the present invention may be implemented. Many other types of data processing systems may be likewise configured to specifically implement the mechanisms of the illustrative embodiments.

FIG. 4 is a block diagram of an example data processing system in which aspects of the illustrative embodiments are implemented. Data processing system 400 is an example of a computer, such as server 304A or client 310 in FIG. 3, in which computer usable code or instructions implementing the processes for illustrative embodiments of the present invention are located. In one illustrative embodiment, FIG. 4 represents a server computing device, such as a server 304A, which, which implements a cognitive system 300 and QA system pipeline 308 augmented to include the additional mechanisms of the illustrative embodiments described hereafter.

In the depicted example, data processing system 400 employs a hub architecture including north bridge and memory controller hub (NB/MCH) 402 and south bridge and input/output (I/O) controller hub (SB/ICH) 404. Processing unit 406, main memory 408, and graphics processor 410 are connected to NB/MCH 402. Graphics processor 410 is connected to NB/MCH 402 through an accelerated graphics port (AGP).

In the depicted example, local area network (LAN) adapter 412 connects to SB/ICH 404. Audio adapter 416, keyboard and mouse adapter 420, modem 422, read only memory (ROM) 424, hard disk drive (HDD) 426, CD-ROM drive 430, universal serial bus (USB) ports and other communication ports 432, and PCI/PCIe devices 434 connect to SB/ICH 404 through bus 438 and bus 440. PCI/PCIe devices may include, for example, Ethernet adapters, add-in cards, and PC cards for notebook computers. PCI uses a card bus controller, while PCIe does not. ROM 424 may be, for example, a flash basic input/output system (BIOS).

HDD 426 and CD-ROM drive 430 connect to SB/ICH 404 through bus 440. HDD 426 and CD-ROM drive 430 may use, for example, an integrated drive electronics (IDE) or serial advanced technology attachment (SATA) interface. Super I/O (SIO) device 436 is connected to SB/ICH 404.

An operating system runs on processing unit 406. The operating system coordinates and provides control of various components within the data processing system 400 in FIG. 4. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 400.

As a server, data processing system 400 may be, for example, an IBM® eServer™ System p® computer system, running the Advanced Interactive Executive (AIX®) operating system or the LINUX® operating system. Data processing system 400 may be a symmetric multiprocessor (SMP) system including a plurality of processors in processing unit 406. Alternatively, a single processor system may be employed.

Instructions for the operating system, the object-oriented programming system, and applications or programs are located on storage devices, such as HDD 426, and are loaded into main memory 408 for execution by processing unit 406. The processes for illustrative embodiments of the present invention are performed by processing unit 406 using computer usable program code, which is located in a memory such as, for example, main memory 408, ROM 424, or in one or more peripheral devices 426 and 430, for example.

A bus system, such as bus 438 or bus 440 as shown in FIG. 4, is comprised of one or more buses. Of course, the bus system may be implemented using any type of communication fabric or architecture that provides for a transfer of data between different components or devices attached to the fabric or architecture. A communication unit, such as modem 422 or network adapter 412 of FIG. 4, includes one or more devices used to transmit and receive data. A memory may be, for example, main memory 408, ROM 424, or a cache such as found in NB/MCH 402 in FIG. 4.

Those of ordinary skill in the art will appreciate that the hardware depicted in FIGS. 3 and 4 may vary depending on the implementation. Other internal hardware or peripheral devices, such as flash memory, equivalent non-volatile memory, or optical disk drives and the like, may be used in addition to or in place of the hardware depicted in FIGS. 3 and 4. Also, the processes of the illustrative embodiments may be applied to a multiprocessor data processing system, other than the SMP system mentioned previously, without departing from the spirit and scope of the present invention.

Moreover, the data processing system 400 may take the form of any of a number of different data processing systems including client computing devices, server computing devices, a tablet computer, laptop computer, telephone or other communication device, a personal digital assistant (PDA), or the like. In some illustrative examples, data processing system 400 may be a portable computing device that is configured with flash memory to provide non-volatile memory for storing operating system files and/or user-generated data, for example. Essentially, data processing system 400 may be any known or later developed data processing system without architectural limitation.

FIG. 5 illustrates an example of a cognitive system processing pipeline which, in the depicted example, is a question and answer (QA) system pipeline used to process an input question in accordance with one illustrative embodiment. As noted above, the cognitive systems with which the illustrative embodiments may be utilized are not limited to QA systems and thus, not limited to the use of a QA system pipeline. FIG. 5 is provided only as one example of the processing structure that may be implemented to process a natural language input requesting the operation of a cognitive system to present a response or result to the natural language input.

The QA system pipeline of FIG. 5 may be implemented, for example, as QA pipeline 308 of cognitive system 300 in FIG. 3. It should be appreciated that the stages of the QA pipeline shown in FIG. 5 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA pipeline of FIG. 5 is augmented, for example, in one or more of the stages to implement the improved mechanism of the illustrative embodiments described hereafter, additional stages may be provided to implement the improved mechanism, or separate logic from the pipeline 500 may be provided for interfacing with the pipeline 500 and implementing the improved functionality and operations of the illustrative embodiments.

As shown in FIG. 5, the QA pipeline 500 comprises a plurality of stages 510-580 through which the cognitive system operates to analyze an input question and generate a final response. In an initial question input stage 510, the QA pipeline 500 receives an input question that is presented in a natural language format. That is, a user inputs, via a user interface, an input question for which the user wishes to obtain an answer, e.g., "Who are Washington's closest advisors?" In response to receiving the input question, the next stage of the QA pipeline 500, i.e. the question and topic analysis stage 520, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 5, the identified major features are then used during the question decomposition stage 530 to decompose the question into one or more queries that are applied to the corpora of data/information 545 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 545. That is, these various sources themselves, different collections of sources, and the like, represent a different corpus 547 within the corpora 545. There may be different corpora 547 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 547 within the corpora 545.

The queries are applied to one or more databases storing information about the electronic texts, documents, articles, websites, and the like, that make up the corpus of data/information, e.g., the corpus of data 306 in FIG. 3. The queries are applied to the corpus of data/information at the hypothesis generation stage 540 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 540, to generate hypotheses for answering the input question. These hypotheses are also referred to herein as "candidate answers" for the input question. For any input question, at this stage 540, there may be hundreds of hypotheses or candidate answers generated that may need to be evaluated.

The QA pipeline 500, in stage 550, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 560, the large number of scores generated by the various reasoning algorithms are synthesized into confidence scores or confidence measures for the various hypotheses. This process involves applying weights to the various scores, where the weights have been determined through training of the statistical model employed by the QA pipeline 500 and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA pipeline 500 that identifies a manner by which these scores may be combined to generate a confidence score or measure for the individual hypotheses or candidate answers. This confidence score or measure summarizes the level of confidence that the QA pipeline 500 has about the evidence that the candidate answer is inferred by the input question, i.e. that the candidate answer is the correct answer for the input question.

The resulting confidence scores or measures are processed by a final confidence merging and ranking stage 570 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 580, a final answer and confidence score, or final set of candidate answers and confidence scores, are generated and output to the submitter of the original input question via a graphical user interface or other mechanism for outputting information.

As shown in FIG. 5, in accordance with one illustrative embodiment, the GAN response generation engine 320 is utilized to evaluate candidate hypotheses, e.g., candidate answers, generated by the hypothesis generation stage 540 with regard to a bag-of-ngrams (BoN) output data structure 326. It is assumed that the GAN 324, has already been trained in a manner similar to that described above with regard to FIGS. 1A and 1B. As described previously, the GAN 324 receives, as inputs, a noise vector z generated by the noise input generator 322, the word embedding matrix of the vocabulary V, and the encoded ngram vector corresponding to the input question from stage 510, the encoded ngram vector being generated by vector generator logic4 of the GAN response generation engine 320 based on the input question from stage 510 being provided to the GAN response engine 320. The GAN 324 generates a bag-of-ngrams (BoN) output data structure 326, such as G(z, q) in FIGS. 2A and 2B. The output data structure 326 is a bag-of-ngrams vector representation, e.g., a bag-of-words, where each slot in the vector represents the probability that the corresponding ngrams that will appear in a correct answer to the input question. The vector representation may include only those ngrams that are actually in a correct answer to the input question.

It should be appreciated that the BoN output data structure 326 may be stored in association with the question in a database (not shown) for retrieval should the same, or similar, question be received again from the same or a different client device. A lookup operation may be performed on such a database based on the ngrams of the input question, extracted features of the input question, or the like, and the corresponding BoN output data structure 326 may be retrieved. In this way, the need to generate the BoN output data structure 326 each time the same or similar question is received for processing may be avoided.

The hypotheses generated in the hypothesis generation stage 540 may be converted to encoded ngram vectors by the vector generator 323 for comparison against the BoN output data structure 326. The ngrams of the hypotheses are compared to the ngrams in the BoN output data structure 326 to calculate a measure of the number of matching ngrams for each hypothesis, e.g., each candidate answer. This could be simply a count of the number of matching ngrams, or it may be a statistical measure generated using any suitable statistical measure of correlation of the ngrams of a hypothesis with ngrams of the BoN output data structure 326 for the input question. These metrics are referred to herein as a BoN correlation score. The GAN response generation engine 320 then returns the BoN correlation scores for each of the hypotheses to the hypothesis and evidence scoring stage 550. The hypothesis and evidence scoring stage 550 may utilize the BoN correlation scores only, or in combination with other criteria for scoring hypotheses as discussed above, to rank the hypotheses relative to one another. Thereafter, the pipeline 500 operates as discussed above to select a final answer that is output by the pipeline 500 and returned to the originator of the input question.

Thus, the illustrative embodiments provide mechanisms for improving answer selection in a cognitive system such as a QA system by providing a bag-of-ngrams evaluation for selecting a correct answer to a question. The GAN provides an accurate representation of the ngrams that are likely to appear in a correct answer to the input question and these ngrams may be used to evaluate the candidate answers, thereby increasing the accuracy of the final answer generated.

Figure 6:
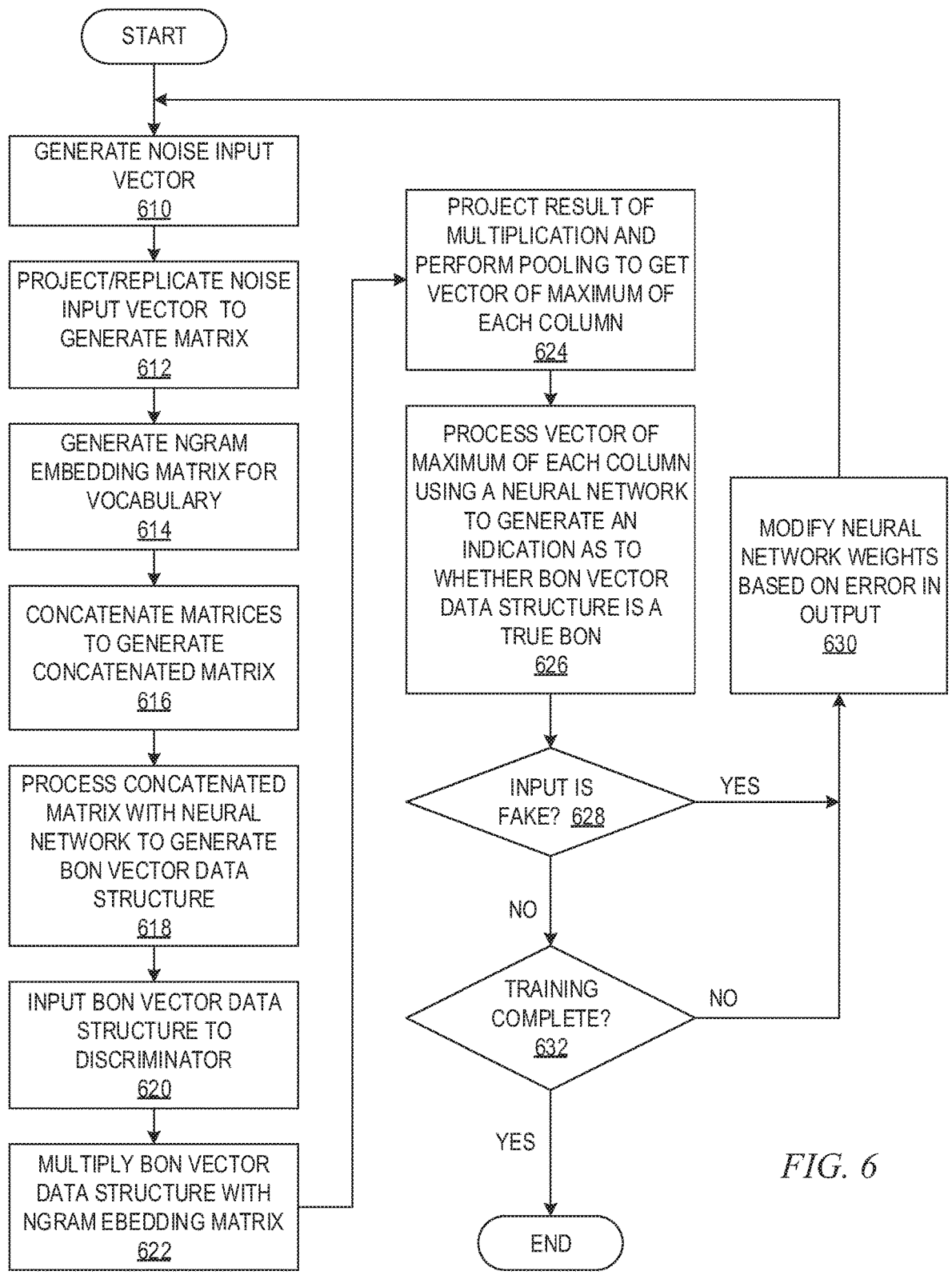
FIG. 6 is a flowchart outlining an example operation for training a GAN to generate a bag-of-ngrams for use in performing a natural language processing operation in accordance with one illustrative embodiment.

FIG. 6 is a flowchart outlining an example operation for training a GAN to generate a bag-of-ngrams for use in performing a natural language processing operation in accordance with one illustrative embodiment. Steps 610-618 may be performed in a generator of the GAN while steps 620-626 may be performed by a discriminator of the GAN. Steps 628-634 may be performed by training logic for modifying the operation of the neural network of the generator as needed to maximize the error in the discriminator, i.e. fool the discriminator.

As shown in FIG. 6, the operation starts by generating a noise input vector (step 610). The noise input vector is projected and replicated to generate a matrix (step 612). A n-gram embedding matrix is generated for the vocabulary (step 614) and concatenated with the matrix generated from the project/replication of the noise input vector (step 616). Each row of the concatenated matrix is processed by a neural network to generate a bag-of-ngrams (BoN) vector data structure representing the probability distribution over the ngrams of the vocabulary (step 618).

The BoN vector data structure is input to the discriminator of the GAN (step 620) which multiplies the BoN vector data structure with the n-gram embeddings matrix for the n-gram vocabulary (step 622). The result is projected and pooling is performed to generate a vector of the maximum of each column in the resulting matrix (step 624). The vector is processed by a neural network to generate an indication as to whether the BoN vector data structure represents a true or false BoN, i.e. whether the discriminator believes that the BoN vector data structure was generated from actual natural language content or is instead synthetic (step 626).

A determination is made as to whether the discriminator is correct in its determination (step 628). If so, then the operation of the neural network in the generator is modified, e.g., weights are modified, to attempt to improve the BoN output data structure such that it will fool the discriminator (step 630). If the output is not correct, a determination is made as to whether training is complete, i.e. the GAN has converged (step 632). It is known that the GAN has converged when the probability given by the discriminator is a predetermined value for both generated instances and real instances, e.g., 0.5. When this occurs, the discriminator cannot distinguish between generated and real instances. If the training is complete, the operation terminates. Otherwise, the training continues by modifying the neural network operation (step 630) and returning to step 610. It should be noted that after training, the discriminator is no longer used and only the generator is utilized.

Figure 7:
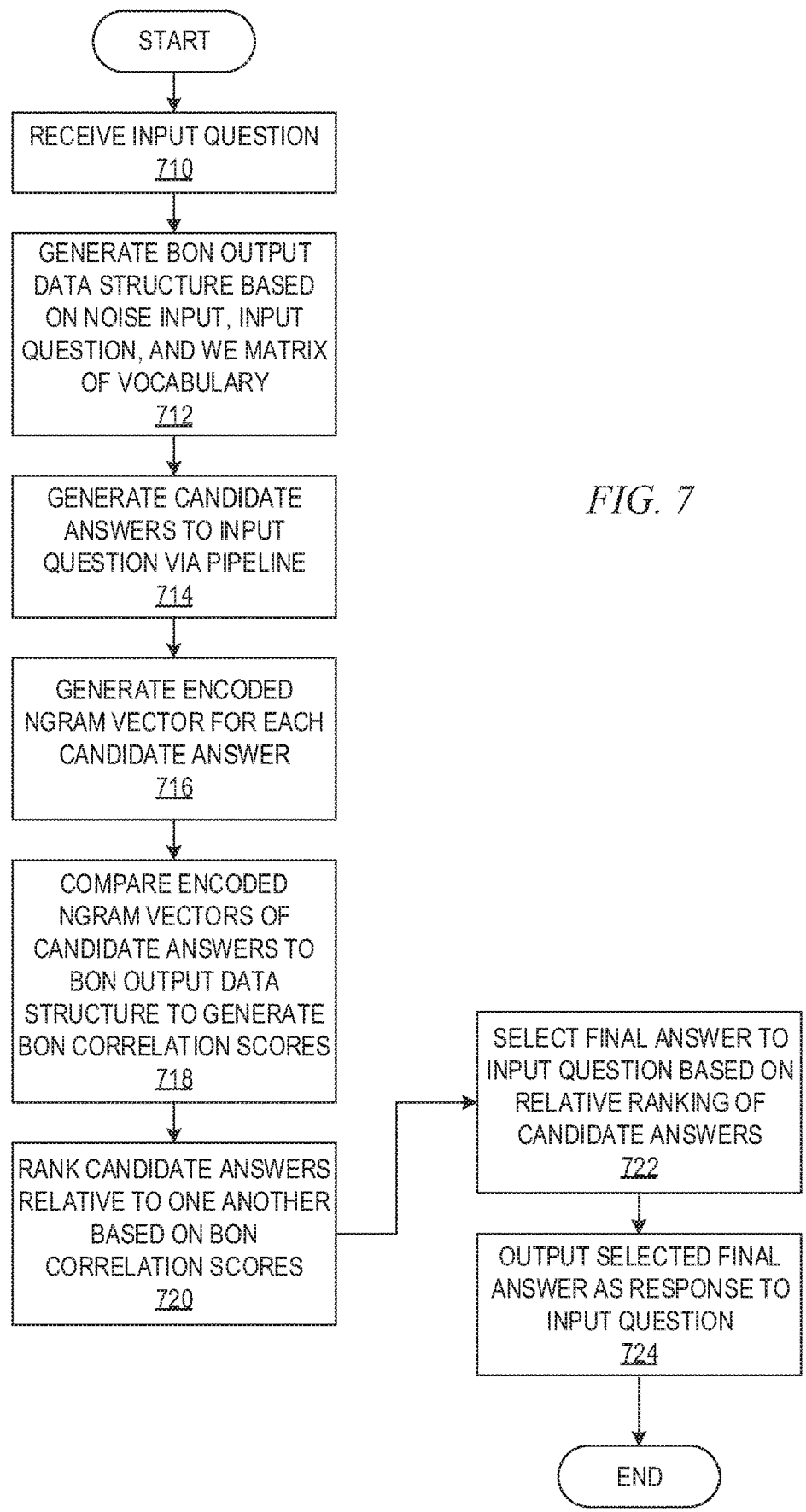
FIG. 7 is a flowchart outlining an example operation for utilizing a trained GAN to perform answer selection in accordance with one illustrative embodiment.

FIG. 7 is a flowchart outlining an example operation for utilizing a trained GAN to perform answer selection in accordance with one illustrative embodiment. As shown in FIG. 7, the operation starts by receiving an input question (step 710). A bag-of-ngrams (BoN) output data structure is generated based on a noise input, a word embedding of the input question, and a word embedding matrix of the vocabulary (step 712). The QA system generates candidate answers for the input question via the QA pipeline (step 714). An encoded ngram vector is generated for each candidate answer (step 716) and these encoded ngram vectors are compared to the BoN output data structure to generate BoN correlation scores (step 718).

The candidate answers are ranked relative to one another based on the BoN correlation scores (step 720). A final answer to the input question based on the relative rankings of the candidate answers is selected (step 722). The selected final answer is then output as a response to the input question (step 724). The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions executed by the at least one processor to configure the processor to implement a Question Answering (QA) system, the method comprising:
   training a generator neural network of a generative adversarial network (GAN) to generate a bag-of-ngrams (BoN) output representing unlabeled data for performing a natural language processing operation;
   obtaining, by the QA system, a plurality of candidate answers to a natural language question, wherein each candidate answer comprises one or more ngrams;
   generating, by the QA system, for each candidate answer in the plurality of candidate answers, a confidence score associated with the candidate answer based on a comparison of the one or more ngrams in the candidate answer to ngrams in the BoN output of the generator neural network of the GAN, wherein the confidence score represents a confidence that the candidate answer is a correct answer to the input natural language question;
   selecting, by the QA system, at least one final answer to the input natural language question from the plurality of candidate answers based on the confidence scores associated with the candidate answers; and
   outputting, by the QA system, the selected at least one final answer to the source computing device.

2. The method of claim 1, wherein the generator neural network is trained to generate a BoN that represents ngrams present in a correct answer to the input question.

3. The method of claim 1, wherein generating, for each candidate answer in the plurality of candidate answers, the confidence score associated with the candidate answer comprises scoring the candidate answer based on a degree of matching of the one or more ngrams in the candidate answers to ngrams in the BoN.

4. The method of claim 3, wherein a candidate answer having a highest degree of matching with the BoN is selected as the at least one final answer for the input natural language question.

5. The method of claim 1, wherein training the generator neural network of a GAN to generate a bag-of-ngrams (BoN) output representing unlabeled data for performing a natural language processing operation comprises:
   configuring the generator neural network of the GAN to generate a bag-of-ngrams (BoN) output based on a noise vector input;
   configuring a discriminator neural network of the GAN to receive a BoN input, where the BoN input is either the BoN output from the generator neural network or a BoN input associated with an actual portion of natural language text;
   configuring the discriminator neural network of the GAN to output an indication of a probability as to whether the input BoN is from the actual portion of natural language text or is the BoN output of the generator neural network; and
   training the generator neural network and discriminator neural network based on a feedback mechanism that compares the output indication from the discriminator neural network to an indicator of whether the input BoN is from the actual portion of natural language text of the BoN output of the generator neural network.

6. The method of claim 5, wherein:
   the generator neural network produces the BoN output as a vector output, and wherein each vector slot in the vector output of the BoN output is set to a value indicative of a probability of whether a corresponding ngram is in the BoN, and
   the discriminator neural network performs one or more statistical value analysis operations or feature extraction analysis operations on the BoN output of the generator neural network to score the BoN output and generate the indication of the probability as to whether the BoN output is from an actual portion of natural language text.

7. The method of claim 5, wherein the generator neural network, during training of the generator neural network and discriminator neural network:
   receives a noise vector input;
   projects and replicates the noise vector input to form a first matrix data structure;
   retrieves an embedding of each ngram in a vocabulary comprising a full set of ngrams that may be represented in the BoN;
   generates a second matrix based on the retrieved embeddings, wherein each embedding is represented as a row in the second matrix;
   concatenates the first matrix and the second matrix to generate a concatenation matrix;
   inputs each row of the concatenation matrix into a neural network; and
   processes each row of the concatenation matrix through the neural network to generate the BoN output.

8. The method of claim 5, wherein each row of the concatenation matrix comprises a first portion corresponding to the first matrix, and a second portion corresponding to the second matrix.

9. The method of claim 5, wherein:
   the neural network is a multi-layer perceptron that uses rectified linear unit as an activation function of an output layer of the neural network, and
   the neural network outputs a numerical value that indicates a probability that a corresponding ngram is present in the BoN based on the noise vector input.

10. The method of claim 5, wherein the discriminator neural network, during training of the generator neural network and discriminator neural network:
   receives the BoN input;
   retrieves an embedding of each ngram in a vocabulary comprising a full set of ngrams that may be represented in the BoN;
   generates a first matrix based on the retrieved embeddings, wherein each embedding is represented as a row in the first matrix;
   multiplies the BoN input with the first matrix;
   projects results of the multiplication of the BoN input with the first matrix to generate a second matrix;

performs sum pooling on the second matrix to generate a feature vector output; and processes the feature vector output via a neural network to generate an output indicating whether or not the BoN input is from the actual portion of natural language text or is the BoN output of the generator neural network.

11. A computer program product comprising a computer readable storage medium having a computer readable program stored therein, wherein the computer readable program, when executed on a computing device, configures the computing device to implement a Question Answering (QA) system, and causes the computing device to:

train a generator neural network of a generative adversarial network (GAN) to generate a bag-of-ngrams (BoN) output representing unlabeled data for performing a natural language processing operation;

obtain, by the QA system, a plurality of candidate answers to a natural language question, wherein each candidate answer comprises one or more ngrams;

generate, by the QA system, for each candidate answer in the plurality of candidate answers, a confidence score associated with the candidate answer based on a comparison of the one or more ngrams in the candidate answer to ngrams in the BoN output of the generator neural network of the GAN, wherein the confidence score represents a confidence that the candidate answer is a correct answer to the input natural language question;

select, by the QA system, at least one final answer to the input natural language question from the plurality of candidate answers based on the confidence scores associated with the candidate answers; and output, by the QA system, the selected at least one final answer to the source computing device.

12. The computer program product of claim 11, wherein the generator neural network is trained to generate a BoN that represents ngrams present in a correct answer to the input question.

13. The computer program product of claim 11, wherein generating, for each candidate answer in the plurality of candidate answers, the confidence score associated with the candidate answer comprises scoring the candidate answer based on a degree of matching of the one or more ngrams in the candidate answers to ngrams in the BoN.

14. The computer program product of claim 13, wherein a candidate answer having a highest degree of matching with the BoN is selected as the at least one final answer for the input natural language question.

15. The computer program product of claim 11, wherein training the generator neural network of a GAN to generate a bag-of-ngrams (BoN) output representing unlabeled data for performing a natural language processing operation comprises:

configuring the generator neural network of the GAN to generate a bag-of-ngrams (BoN) output based on a noise vector input;

configuring a discriminator neural network of the GAN to receive a BoN input, where the BoN input is either the BoN output from the generator neural network or a BoN input associated with an actual portion of natural language text;

configuring the discriminator neural network of the GAN to output an indication of a probability as to whether the input BoN is from the actual portion of natural language text or is the BoN output of the generator neural network; and training the generator neural network and discriminator neural network based on a feedback mechanism that compares the output indication from the discriminator neural network to an indicator of whether the input BoN is from the actual portion of natural language text of the BoN output of the generator neural network.

16. The computer program product of claim 15, wherein:

the generator neural network produces the BoN output as a vector output, and wherein each vector slot in the vector output of the BoN output is set to a value indicative of a probability of whether a corresponding ngram is in the BoN, and the discriminator neural network performs one or more statistical value analysis operations or feature extraction analysis operations on the BoN output of the generator neural network to score the BoN output and generate the indication of the probability as to whether the BoN output is from an actual portion of natural language text.

17. The computer program product of claim 15, wherein the generator neural network, during training of the generator neural network and discriminator neural network:

receives a noise vector input;

projects and replicates the noise vector input to form a first matrix data structure;

retrieves an embedding of each ngram in a vocabulary comprising a full set of ngrams that may be represented in the BoN;

generates a second matrix based on the retrieved embeddings, wherein each embedding is represented as a row in the second matrix;

concatenates the first matrix and the second matrix to generate a concatenation matrix;

inputs each row of the concatenation matrix into a neural network; and processes each row of the concatenation matrix through the neural network to generate the BoN output.

18. The computer program product of claim 15, wherein each row of the concatenation matrix comprises a first portion corresponding to the first matrix, and a second portion corresponding to the second matrix.

19. The computer program product of claim 15, wherein the discriminator neural network, during training of the generator neural network and discriminator neural network:

receives the BoN input;

retrieves an embedding of each ngram in a vocabulary comprising a full set of ngrams that may be represented in the BoN;

generates a first matrix based on the retrieved embeddings, wherein each embedding is represented as a row in the first matrix;

multiplies the BoN input with the first matrix;

projects results of the multiplication of the BoN input with the first matrix to generate a second matrix;

performs sum pooling on the second matrix to generate a feature vector output; and processes the feature vector output via a neural network to generate an output indicating whether or not the BoN input is from the actual portion of natural language text or is the BoN output of the generator neural network.

20. An apparatus comprising:

at least one processor; and at least one memory coupled to the at least one processor, wherein the at least one memory comprises instructions which, when executed by the at least one processor, configures the at least one processor to implement a Question Answering (QA) system, and causes the at least one processor to:

train a generator neural network of a generative adversarial network (GAN) to generate a bag-of-ngrams (BoN) output representing unlabeled data for performing a natural language processing operation;

obtain, by the QA system, a plurality of candidate answers to a natural language question, wherein each candidate answer comprises one or more ngrams; generate, by the QA system, for each candidate answer in the plurality of candidate answers, a confidence score associated with the candidate answer based on a comparison of the one or more ngrams in the candidate answer to ngrams in the BoN output of the generator neural network of the GAN, wherein the confidence score represents a confidence that the candidate answer is a correct answer to the input natural language question;

select, by the QA system, at least one final answer to the input natural language question from the plurality of candidate answers based on the confidence scores associated with the candidate answers; and output, by the QA system, the selected at least one final answer to the source computing device.

\* \* \* \* \*